United States Patent
Villaret

(10) Patent No.: US 8,124,928 B2
(45) Date of Patent: Feb. 28, 2012

(54) OPTICAL ENCODER COMPRISING TWO PATTERN ARRAYS AND SEVERAL BELL SHAPED LIGHT GUIDES

(75) Inventor: Yves Villaret, Hadera (IL)

(73) Assignee: Taskawa Europe Technology Ltd., Rosh HaAyin (IL)

( * ) Notice: Subject to any disclaimer, the term of this patent is extended or adjusted under 35 U.S.C. 154(b) by 361 days.

(21) Appl. No.: 12/376,437

(22) PCT Filed: Aug. 6, 2007

(86) PCT No.: PCT/IL2007/000975
§ 371 (c)(1),
(2), (4) Date: Feb. 5, 2009

(87) PCT Pub. No.: WO2008/018059
PCT Pub. Date: Feb. 14, 2008

(65) Prior Publication Data
US 2010/0163716 A1     Jul. 1, 2010

(30) Foreign Application Priority Data
Aug. 8, 2006   (IL) .......................................... 177367

(51) Int. Cl.
G01D 5/34 (2006.01)
(52) U.S. Cl. ................... 250/231.13; 356/617; 359/439; 359/441
(58) Field of Classification Search ........... 250/231.13–231.18, 237 R, 237 G; 356/616–619, 436–442; 341/11, 13, 31; 359/436–442
See application file for complete search history.

(56) References Cited

U.S. PATENT DOCUMENTS

| | | | |
|---|---|---|---|
| 4,268,747 A | 5/1981 | Becchi et al. | |
| 6,290,381 B1 * | 9/2001 | Mangum et al. | 362/554 |
| 2003/0193016 A1 * | 10/2003 | Chin et al. | 250/231.13 |
| 2004/0113058 A1 | 6/2004 | Sonoki | |
| 2005/0189203 A1 | 9/2005 | Kodani et al. | |

FOREIGN PATENT DOCUMENTS
WO   WO 2004/063671    7/2004

OTHER PUBLICATIONS

Response Dated Feb. 13, 2011 to Office Action Dated Nov. 23, 2010 From the State Intellectual Property Office of the People's Republic of China Re. Application No. 200780037573.X.

(Continued)

*Primary Examiner* — Francis M Legasse, Jr.

(57) ABSTRACT

An optical encoder for measuring the rotary angle of a rotating shaft comprising an electronic board with light emitter and light sensor means disposed between a pair of overlying light guides having a common symmetry axis that coincides with the shaft rotation axis, the light guides receiving light from a light emitter means on the electronic board and returning light to a light sensor means the electronic board; an optical pattern of two concentric annular sections attached to the rotating shaft and an optical pattern of two concentric annular sections on a stationary device. A method for measuring the rotary angle of the rotating shaft by emitting light from the electronic board into the light guides and processing the signals received on the electronic board from light rays returning through the light guides after interacting with the said optical patterns.

15 Claims, 13 Drawing Sheets

OTHER PUBLICATIONS

Translation of Office Action Dated Nov. 23, 2010 From the State Intellectual Property Office of the People's Republic of China Re. Application No. 200780037573.X.

International Preliminary Report on Patentability Dated Nov. 26, 2008 From the International Preliminary Examining Authority Re.: Application No. PCT/IL2007/000975.

International Search Report and the Written Opinion Dated Feb. 4, 2008 From the International Searching Authority Re.: Application No. PCT/IL2007/000975.

Translation of Office Action Dated Jul. 7, 2011 From the State Intellectual Property Office of the People's Republic of China Re. Application No. 200780037573.X.

* cited by examiner

OPTICAL ENCODER COMPRISING TWO PATTERN ARRAYS AND SEVERAL BELL SHAPED LIGHT GUIDES

RELATED APPLICATIONS

This Application is a National Phase of PCT patent application Ser. No. PCT/IL2007/000975 having International filing date of Aug. 6, 2007, which claims the benefit of Israel Patent Application No. 177367 filed on Aug. 8, 2006. The contents of the above Applications are all incorporated herein by reference.

TECHNICAL FIELD

The present invention relates to Optical Encoders for electrical motors or other rotary devices.

BACKGROUND ART

Optical Encoders have been widely used as position feedback devices in systems for controlling the position of the rotary shaft in different kinds of rotary devices. Thus for example Optical Encoders are widely used in Robots, automatic machines and similar devices.

Examples of such optical encoders can be found in patents U.S. Pat. No. 4,268,747 by Becchi et al. (1981), and U.S. Pat. No. 4,410,798 by Breslow (1983).

Optical encoder systems generally include a rotating optical disc, with a pattern of sections of alternating optical properties (for example transparent and opaque sections) fixed on the motor shaft. The disc is placed in the path of an optical beam, between a light emitter and a light sensor. The light sensor then creates an electric signal with amplitude changing periodically with the shaft position. An electronic circuit is used to count the number periods of that electronic signal, and thus provide information on the shaft position, relative to an initial position.

In order to sense rotation direction, in most of the prior art optical encoders two optical beams are used, and the path of the second beam is positioned so as to produce a second electrical signal similar to the first one, but shifted by a quarter of the period of the first signal. Such two signals will be further referred to as being in quadrature.

An improvement of this method consists of using a light beam that covers several segments of a circular pattern section with alternating optical properties provided on a rotary disc and adding a fixed mask that has a pattern similar to the rotating optical disc pattern, containing several consecutive segments with alternating optical properties and covering at least the surface of the light sensor between the rotating optical disc and the light sensor. In this arrangement, when mask and disc patterns coincide, a maximum of light is transmitted whereas when mask and disc patterns are in opposite phase, light transmission is minimum. Thus, the light transmitted to the sensor becomes a periodic function of the angular position. This method provides an improved signal shape, due to the fact that tolerances in the exact shape of pattern segments are averaged over a number of segments.

It is also known to enhance encoder resolution by feeding the analog amplitude of the signals in quadrature to a processing unit. The processing unit can then be programmed to calculate the angle of the shaft within a single segment of the pattern, thus providing a much higher resolution. For example a disc with 512 slots will provide an angle resolution of $\frac{1}{65536}$ of a cycle.

There is a continuing trend of improving the precision and resolution of the position feedback devices, while reducing costs.

One factor limiting precision is the slightly eccentric movement of the rotating optical disc, which is due to some mechanical tolerance. Since each of the two beams intersects the optical disc at a defined position on the disc, on one side of the shaft, any lateral movement of the shaft will affect the amount of light that reaches the light detector, thus creating error in the position information. Such a lateral movement may be caused by tolerance in the roll bearing holding the shaft, or by tolerance in the optical disc assembly. In order to avoid this kind of error, many encoders include an integral shaft and high precision bearing and are coupled to the motor shaft by means of a coupling whereby costs are considerably raised.

Another factor is the precision of the pattern on the rotating disc. Irregularities in the pattern generate unequal periods relative to the angular position of the shaft. Where the two beams intersect the optical disc at respective defined positions on the disc on one side of the shaft, as described above, irregularities of the disc pattern will influence the amount of light that reaches the light detector, and again introduce error into the position information.

In the Optical Encoder of PCT/IL 2004/000042 improved precision is obtained by using two or more light guides that project the light on the rotating disc in the form of two conical beams that create two concentric circles of light having a geometrical center that coincides with the rotation symmetry center. On the optical disc a pair of concentric annular pattern sections, each having a large number of segments with alternating optical properties are provided, the geometrical center of the annular patterns coinciding with the rotation symmetry center, and the diameters of the said concentric circles of light being chosen such that each of the concentric circles of light is incident on one of the concentric annular patterns and covers the said annular pattern. This radial symmetry of the inventive Optical Encoder provides compensation for small lateral movements of the shaft and since light signals are collected from a large number of segments equally distributed around the center of symmetry, the effect of irregularities in the shape of the segments is averaged and thus reduced. In the Optical encoder of PCT/IL 2004/000042 both the light that is emanated from the light source towards the optical disc and the light that returns from the optical disc to the sensors are conducted through optical fibers that enter the light guide at an entrance surface. The optical encoder being distant from the electronic board that carries the sensors and from the light source, one or more optical cables are required for this system in addition to a standard electronic cable.

Due to the separation and distance between the optical disc, the light source and the electronic board in prior art Optical encoders, design and wiring problems arise concerning the mounting of these separate parts between the components of the rotating device while at the same time production and mounting costs are increased.

None of the prior art Optical encoders propose an integral electronic board that is located within the Optical encoder assembly and carries the light source, the light sensors and the signal processing means directly on a PCB such that both light source and sensors are close to the symmetry axis of the rotating device, thereby further increasing precision and reducing manufacturing and mounting costs.

An object of the invention is to provide an Optical encoder for a rotary shaft that increases precision and reduces wiring, production and mounting costs by a new integral and symmetric design in which light sensors and light source means are installed on each of the faces of a single PCB and the PCB is placed between a pair of light guides that receive light emitted from opposite sides of the PCB, guide it onto an optical assembly that is suitable for indicating the rotation angle and finally guide the returning light towards the light sensor means on the PCB.

BRIEF SUMMARY OF THE INVENTION

According to a broad aspect of the invention, there is provided an Optical encoder system for measuring the rotary angle of a shaft rotatable about a rotary axis, comprising: first and second pattern arrays operatively associated with the shaft to rotate therewith about the rotary axis; the first and second pattern arrays being concentric to each other and to the rotary axis of the shaft; each of the pattern arrays including alternating segments of different optical properties; first and second light guides fixed with respect to the shaft concentric to each other and to the rotary axis of the shaft; each of the light guides having a small diameter end serving as a light entry surface and a light exit surface for its respective light guide, and a large diameter end having transit surfaces aligned with one of the pattern arrays; light emitters for transmitting light into the small diameter ends of the light guides; and light sensors for sensing light exiting from the small diameter ends of the light guides; characterized in that the light emitters and light sensors are carried by an electronic board interposed between the small diameter ends of the first and second light guides, with one face of the electronic board carrying a light emitter and a light sensor for the first light guide, and the opposite face of the electronic board carrying a light emitter and a light sensor for the second light guide.

BRIEF DESCRIPTION OF THE DRAWINGS

In order to understand the invention and to see how it may be implemented in practice a plurality of embodiments will now he described, by way of nonlimiting example only, with reference to the accompanying drawings, in which.

BEST MODES FOR CARRYING OUT THE INVENTION

The following description is provided, alongside all chapters of the present invention, so as to enable any person skilled in the art to make use of said invention and sets forth the best modes contemplated by the inventor of carrying out this invention. Various modifications, however, will remain apparent to those skilled in the art, since the generic principles of the present invention have been defined specifically to provide a novel optical encoder system and a method for measuring the rotary angle of a rotating shaft, for example a motor shaft, that overcomes the drawbacks of prior art encoders, such as low precision due to distance from light source and/or light sensors, errors introduced as a result of irregularity of optical patterns, errors arising from mechanical vibrations of the motor shaft and others.

The inventive optical encoder system and method has the advantage of being low cost as well as universally adaptable such that it may be used with many standard motor drives or controllers.

In order to better demonstrate the advantages of the system and method of the invention, a conventional encoder system will be described herein below with reference to FIG. 1.

Figure 1:
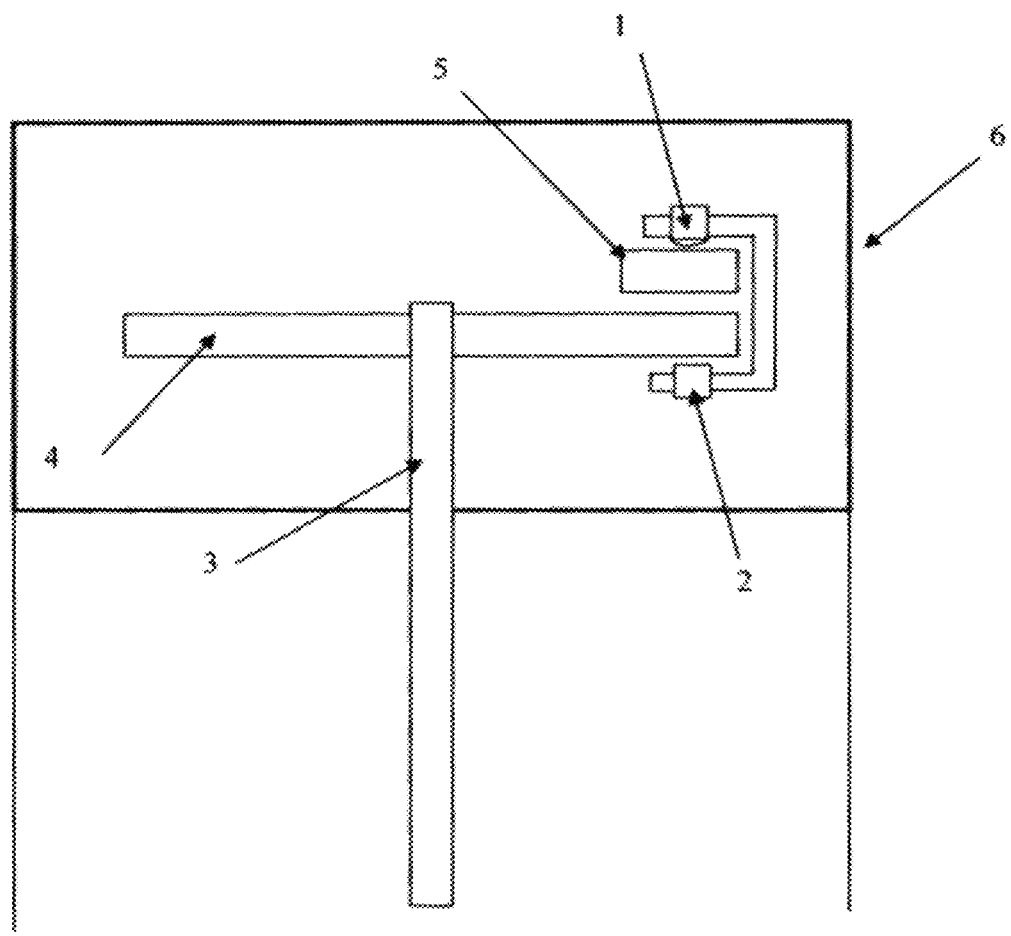
FIG. 1 is a simplified drawing of a conventional encoder.

As shown in FIG. 1, a conventional encoder system comprises: a light source (1), a light detector (2), a motor shaft (3) to which a rotating disc (4) is fixed, and a fixed mask (5). As known in the art, the rotating disc (4) has an annular pattern of alternating transparent and opaque segments, the fixed mask (5) has a fraction of a matching pattern of alternating transparent and opaque segments and the light emitted from the light source passes through the rotating disc (4) and the fixed mask (5) such that when light is emitted from the light source, the amount of light detected on the light detector (2) is a function of the relative positions of the rotating disc and the mask. The output of the light detector (2) is then input to an electronic interface (not shown) that processes the light intensity to calculate the rotary angle of the rotating disc. In conventional encoders, the fixed mask covers a limited number of slots that fit the size of the light beam issued from the light source (1). Such optical encoders have a limited performance and in industrial encoders it is known to use a number of masks and light sensors in order to detect rotation direction and to compensate for errors due to shaft vibration or eccentricity.

Figure 2:
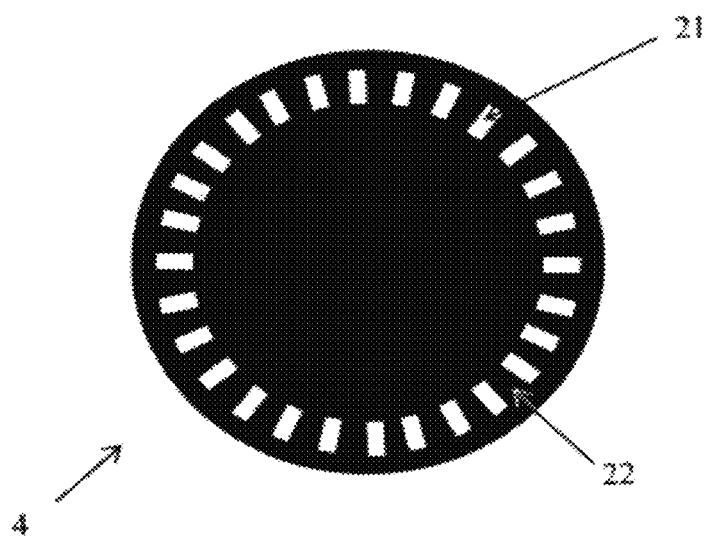
FIG. 2 shows an example of a patterned rotating disc of an encoder.
Figure 3:
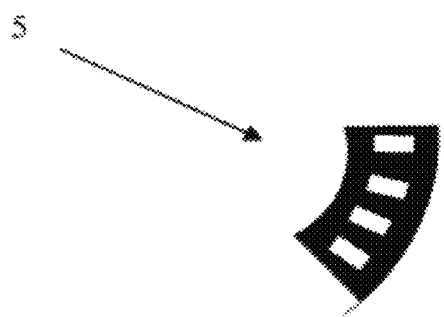
FIG. 3 shows an example of a fixed patterned mask.

An example of a pattern used for rotating discs is shown in FIG. 2 and an example of a matching pattern used for masks is shown in FIG. 3. The pattern consists of alternating segments with different optical properties such as different transparency. In the particular example shown in FIGS. 2 and 3, segments are either totally transparent (21) or totally opaque (22). It will be understood however that patterns may be of many different kinds. For example each section may have a different surface shape, so that light rays are refracted in various directions, slots may be made in accordance with a variety of designs, etc. . . . In this patent, wherever segments of the pattern are referred to as slots it will be understood that other types of patterns with segments of different optical characteristics are also within the scope of the invention.

In these encoders, since the width of the beam passing through the patterns covers a limited number of slots, a small irregularity in the shape of the slots results in imprecision in the position information.

Another limitation to the performances of the prior art encoders is due to mechanical vibrations of the motor shaft when the motor is operated, due to some flexibility in the shaft bearing. Since the light source and sensor are positioned on one side of the shaft, any lateral movement of the shaft and the disc results in a variation in the amount of light passing through the pattern, thus altering the position information. In order to reduce that imprecision, many encoder manufacturers use a separate shaft in the encoder with an additional high quality ball bearing and a coupling element to connect the encoder shaft to the motor shaft, thus adding to the cost of the encoder.

A further cause of limitation is due to the natural dispersion of light rays such that only a small fraction of emitted light reaches the patterned disc and an even smaller fraction of the emitted light is returned to the light sensors to supply the indication of the rotary position or rotary angle.

In PCT/IL2004/000042, an encoder having a pair of light guides that emit a pair of concentric circular light beams and collect returned light from the whole circumference of the optical disc is proposed to improve the precision of the position information received. Position information is further improved by using optical fibers to conduct the light rays from remote light emission means to the light guides through a light entrance surface of the light guides and to conduct the returning light rays from the light guides back to remote sensor means.

The present invention proposes an optical encoder system and method that improve precision of the position information by providing an electronic board that is disposed between a pair of light guides. Light emitter means and light sensor means are provided on optical areas on both sides of the electric board and each of the light guides has at least one light entrance area facing a respective side of the electric board such that a relatively large fraction of light rays from the light emitter means enter the light guide. The inventive optical encoder enhances precision by emitting light from an annular light transit surface of each of the light guides and collecting the light that is reflected by a reflective surface backwards to the light guide after interaction of the said returning light with an annular optical pattern provided on a rotating device that is fixed on the rotating shaft, and with a further annular optical pattern provided on a stationary device such that the amount of returned light will indicate the relative position of the stationary device and the rotating disc and thus the rotary angle of the rotating shaft. Precision is further enhanced by one or more reflective surfaces within the optical guides that enable a relatively large fraction of returned light to reach the light sensor means whereby the precision of the information is further increased.

It is a further advantage of the inventive encoder system that the electronic board that processes the raw signals of the light sensors is positioned between the light guides, thus allowing a symmetric configuration of the encoder, i.e. both light sources and/or light sensors can be placed on or very close to the symmetry axis of the motor shaft.

It is yet another advantage of the inventive encoder system that light sources and light sensors can be mounted directly on the PCB, resulting in reduced fabrication costs.

Thus in accordance with one aspect of the invention an optical encoder system for measuring the rotary angle of a rotating shaft is proposed comprising:

an electronic board with a first face and a second face and with at least one light emission means and at least one light sensor means mounted on each of the said first and second faces; the said electronic board being disposed between a pair of first and second light guides, each of the said light guides having an annular light transit surface area and at least one additional light transit surface area, the said first light guide overlying the said second light guide such that the annular light transit surfaces of the said first light guide and the said second light guide have a common symmetry axis that also coincides with the rotation axis of the said shaft; at least one of the said additional light transit surface areas of the said first light guide located in close proximity to one light emitter means on the said first face of the said electronic board, and at least one of the said additional transit surface areas of the said first light guide located in close proximity to a light sensor means on the said first face of the said electronic board; at least one of the said additional light transit surface areas of the said second light guide located in close proximity to one light emitter means on the said second face of the said electronic board and at least one of the said additional light transit surface areas of the said second light guide located in close proximity to a light sensor means on the second face of the said electronic board; a first optical pattern of two concentric annular sections comprising segments of different optical properties that is provided on a rotating device, the said rotating device being attached to the said rotating shaft; a second optical pattern of two concentric annular sections, further comprising segments of different optical properties, that is provided on a stationary device, such that the symmetry axes of the said patterns coincide with the shaft rotation axis and a reflective surface for returning in a reverse direction light rays exiting from the optical guides through the said annular light transit surfaces.

In accordance with another aspect of the invention, a method for measuring the rotary angle of a rotary shaft is proposed, comprising the following steps:

a. providing an electric board with light emission means and light sensor means attached on a first side and a second side between a pair of overlapping light guides;

b. emitting light from the said light emission means on each of the said first and second sides of the said electronic board into each of the said pair of light guides respectively, through a light transit surface of the said light guide;

c. propagating the light outwards through an annular light transit surface of each of the said light guides respectively; the said annular light transit surfaces being disposed so that their symmetry axes coincide, d. providing at least one rotating optical disc with an optical pattern of two concentric annular sections attached on a rotating shaft having a main rotating axis;

e. providing at least one stationary device with an optical pattern f. providing a reflective surface for reflecting the light back into the said light guides through the said annular transit surface such that the said light is affected by interaction with the patterns provided on the said stationary devices and the said rotating optical device prior to reentering the said optical guides;

g. guiding back a portion of the light beams through the said light guide entrance surface to at least one light sensor means located in proximity to a light transit surface;

h. measuring the intensity of the light reaching the said light sensors; the said intensity of light being a function of the relative angular position of the said stationary devices and the said rotating optical disc; and, i. calculating the rotary angle of the said shaft as a function of the light intensity measured at the light sensors.

In accordance with a preferred embodiment, one or more reflective elements are provided within each of the light guides for guiding back a part of the light beams through the light transit surface to at least one light sensor means in proximity to a light transit surface;

In accordance with yet another aspect of the invention, the encoder of the invention has a standard interface whereby it may be used with a large number of conventional drives.

Figure 4:
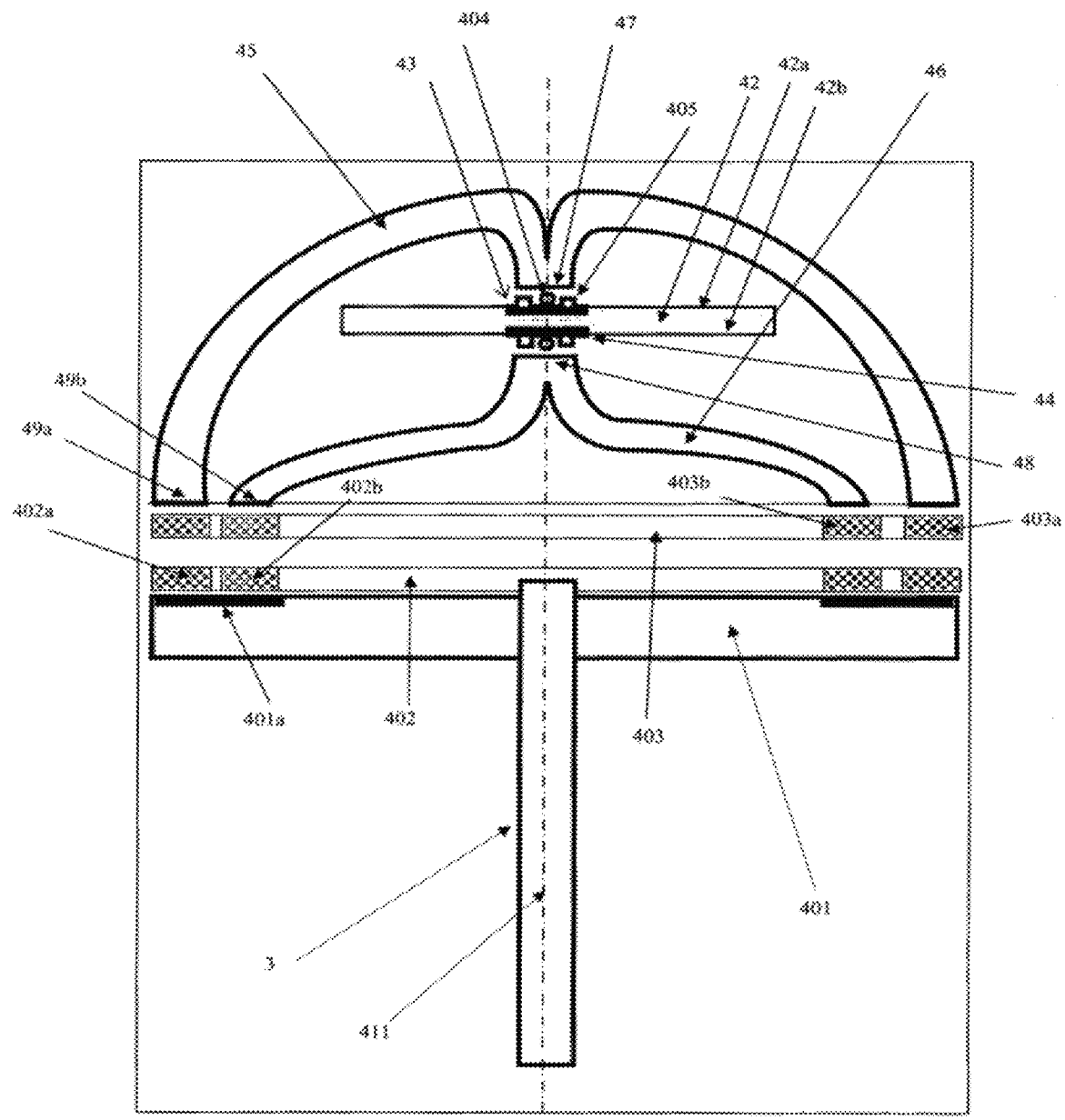
FIG. 4 shows a preferred embodiment of an encoder according to this invention in median section.

FIG. 4 shows a preferred embodiment of an optical encoder assembly according to the present invention for detecting and measuring the rotary movement of a motor shaft (3). It will be understood that the assembly of FIG. 4 is shown by way of example and many other designs may be implemented in the scope of the inventive system and method.

For clarity of the description, the relative position of the encoder components will be described in the direction of the motor shaft rotation axis, the motor shaft being defined as being the lower component in that direction. It will be understood however that the components may be arranged along a horizontal axis or in any other orientation as long as they are aligned with the motor shaft axis.

Referring now to FIG. 4, an Optical Encoder system for measuring the rotary angle of a rotary shaft (3) is shown in longitudinal median section, comprising an electronic board (42) with optical areas (43, 44) on a first side (42a) and on a second side (42b) of the said electronic board (42) respectively and on each of the optical areas (43, 44) a light emission means (404) and a number of light sensor means (405) are mounted. The electronic board is disposed between a pair of light guides (OG) (45, 46). It will be understood by those versed in the art that the light guides (45, 46) are made of transparent material and designed to guide the light rays in accordance with the total reflection laws as applied in the well known techniques of light guides and/or optical fibers. It will be further understood that the number of light emission means on each of the said optical areas (43, 44) may be more than one.

In the drawing of FIG. 4 the light guides (45, 46) and the said electronic board (42) are fixed above the rotating shaft (3). It will be understood however that the light guides and the electronic board may be fixed in front of the rotating shaft and the rotating shaft axis may be oriented in a horizontal direction or in any other direction as suitable for a specific embodiment. Referring again to FIG. 4, the light guides (45, 46) and the said optical areas (43, 44) have an axis of symmetry (411) that coincides with the axis of the rotating shaft (3). The light guides (45, 46) are transparent and bell shaped and disposed such that the light guide 46, that has a larger diameter than the light guide 45, overlaps the light guide 45. Each of the light guides has a light transit surface (47) and (48) respectively wherein the light transit surface 47 of the light guide 45 is disposed such that it faces the light transit surface 48 of the light guide 46 and the light transit surfaces (47, 48) are juxtaposed to the optical areas (43, 44) on the said first side (42a) and on the said second side (42b) of the electronic board respectively such that each of the said light transit surfaces is located in close proximity to the said light emission means (404) and to at least one of the said light sensor means (405). Each of the light guides (45, 46) further has an annular light exit surface (49a, 49b) and the two annular light exit surfaces (49a) and (49b) are concentric with each other. A stationary device (403) is located below the said light guides (45, 46) and on the said stationary device (403) a pair of concentric annular pattern sections (403a; 403b) (hereinafter: stationary pattern) are provided opposite the annular light exit surfaces (49a; 49b). Below the said stationary device a first rotating device (402) such as a rotating optical disc is attached to the rotary shaft (3) and on the said rotating device a pair of concentric annular pattern sections (402a; 402b) (hereinafter: rotary pattern) are provided, juxtaposed to the said stationary pattern. A second rotating device (401) has an upper surface with a reflective area (401a) that is facing the rotary pattern sections (402a; 402b).

Referring once again to the optical encoder assembly of FIG. 4, light emitted from a light source mounted on the optical area 44 of the electronic board 42 enters the light guide 45 through the entrance surface 47 and is guided through the light guide 45 until it reaches the annular transit surface 49a of the light guide 45 and is emitted through the said annular exit surface 49a of the light guide 45 in the shape of an annular beam. Depending on the relative angular position of the stationary device 403 and the rotating device 402 a variable amount of light rays reaches the reflective surface 401a to be reflected backward by the said reflective surface 401a. The reflected light again passes through the rotary pattern 402a and through the stationary pattern 403a in a reverse direction. The light is then propagated towards the light guides and re-enters the light guide 45 through the annular transit surface 49a, the amount of reentering light being dependent on the relative angular position of the rotary pattern 402a and the stationary pattern 403a. The light is then guided up to the transit surface 47 such that a part of the light rays reaches the light sensor(s) on the optical area 43 of the electronic board 42.

In accordance with the preferred embodiment of the invention, light is propagated into both optical guides 45 and 46 such that two electrical signals are simultaneously obtained. The light sensors then output an electronic signal varying as a function of the rotary angle of the shaft 3. Conventional electronic and software processing means known for encoders can be used to calculate the rotation movement.

It will be understood that many other optical solutions may be applied to make the light pass through the optical patterns in one direction and reflect them in the direction of the optical guides such that they will pass the optical patterns in the reverse direction.

It will be further understood that the electric board may be made in accordance with many different designs and disposed in different orientations and it may also be implemented as a flexible electric board.

In accordance with the inventive system, the stationary pattern (403a; 403b) may be implemented by providing an optical pattern on the annular light transit surfaces (49a; 49b) in which case the stationary device 402 may be eliminated.

Where the annular transit surfaces 49a, 49b of the light guides are patterned, the said pattern is made of segments of different optical properties that may be alternating opaque and transparent segments or segments of different geometric shape, so that rays exiting the light guide have different directions depending on the optical properties of the segment through which they are emanated or they differ in intensity, again depending on the optical properties of the segment through which they are emanated such that the annular beams that exit the annular exit surfaces 49, 400 are annular patterned beams.

Figure 5:
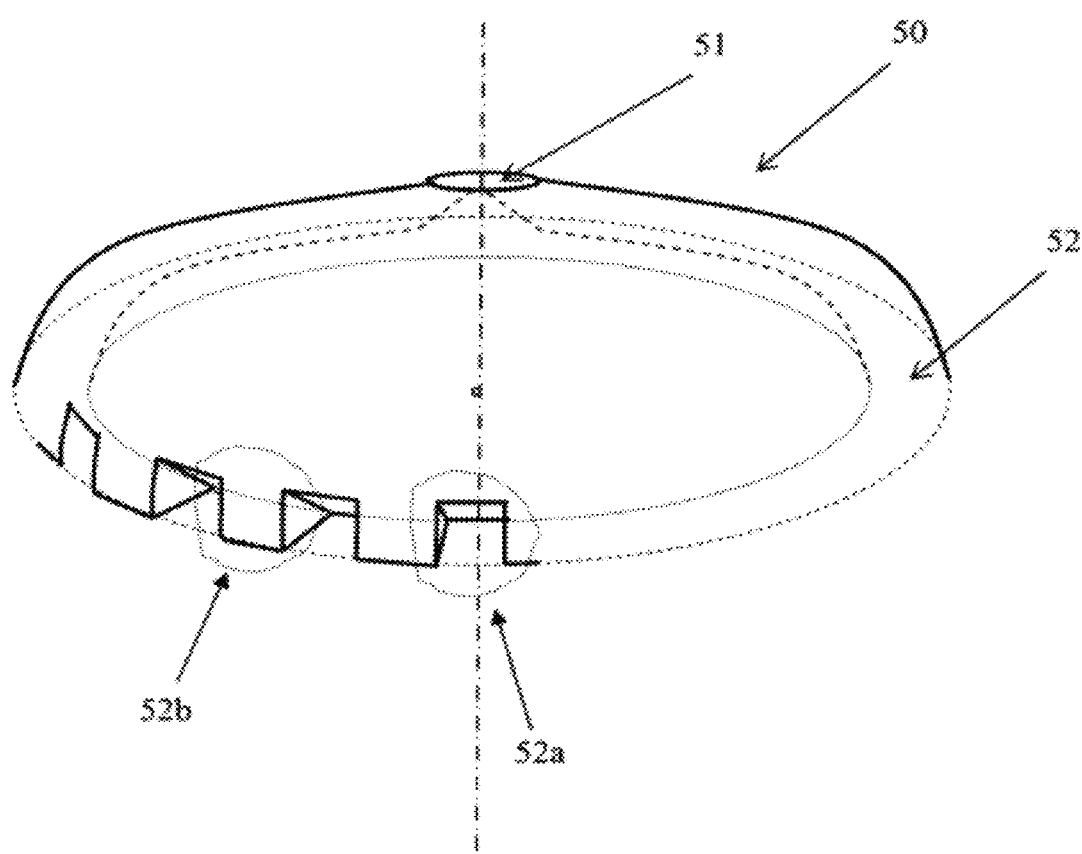
FIG. 5 shows an example of a light guide having an annular surface with segments of different geometric shape.

FIG. 5 shows an example of an embodiment of a light guide 50 with a transit surface 51 and an annular transit surface 52 that operates as the stationary pattern of the optical encoder, wherein on the said annular transit surface a teeth design is provided to create an optical pattern. As seen in FIG. 5, the annular exit surface 52 of the light guide (50) is divided in two types of alternating segments. Segments of a first type (52a) have an exit surface perpendicular to the shaft axis (511), whereas segments of a second type (52b) have an exit surface forming a 45 degrees angle with the shaft axis 511. It will be understood by those versed in the art that rays of light exiting through a segment 52a will be approximately parallel to the symmetry axis 511, while rays of light exiting through a segment 52b will be refracted perpendicularly to the symmetry axis 511.

Figure 6:
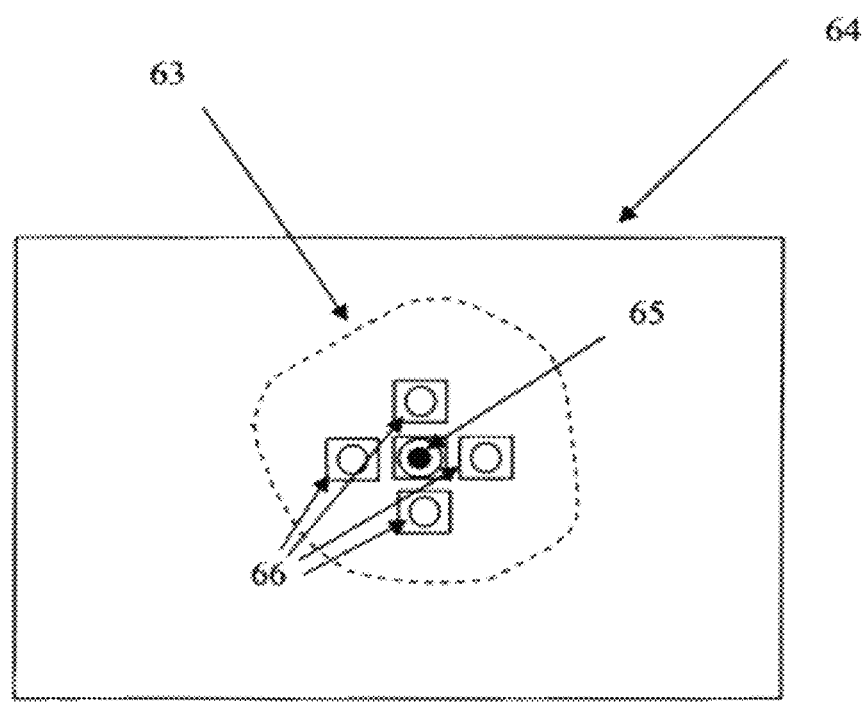
FIG. 6 is an example of an arrangement of light source means and light sensor means on the "optical areas" of an electronic board.

FIG. 6 shows an example of a light source (65) and light sensors (66a, 66b, 66c, 66d) mounted on the optical area 63 of an electronic board 64. It will be understood that many other modes and designs of the optical area 63 may be made that still remain within the scope of the invention.

In the embodiment of FIG. 6, the light source (65) is disposed at the center of the optical area 63 and the electronic board 64, that is also the shaft rotation axis, while light sensor means 66a, 66b, 66c and 66d are placed around the light source 65. This arrangement has the advantage of being radially symmetric, such that all sections of the circular optical pattern on the optical disc and on the annular exit surface have the same theoretic contribution to the total electric signal, whereby the signal output, being the sum of the signals from all the light sensor means (66a, 66b, 66c, 66d), is proportional to a true average of the amount of light passing through all the sections of both annular exit surface and circular rotating disc patterns allowing passage of light in the direction of the light sensor means. As explained above, this averaging reduces drastically the sensitivity of the position information to geometric precision of pattern sections.

It will be understood that a similar result may be achieved by an arrangement in which a light sensor means is disposed at the center of the optical area and a number of light source means are symmetrically disposed around the light source.

Figure 7:
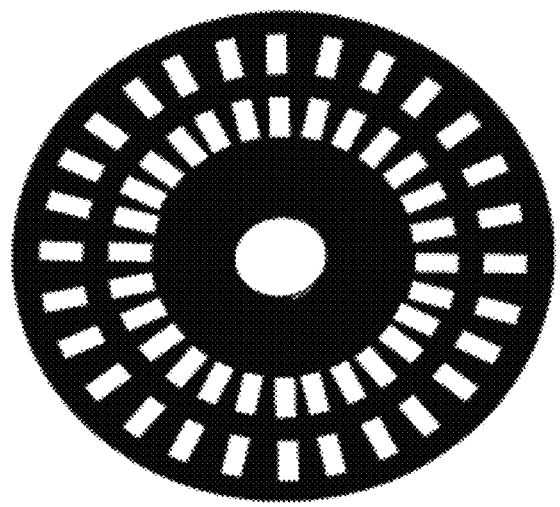
FIG. 7 and FIG. 8 are examples of patterns with a phase difference.
Figure 8:
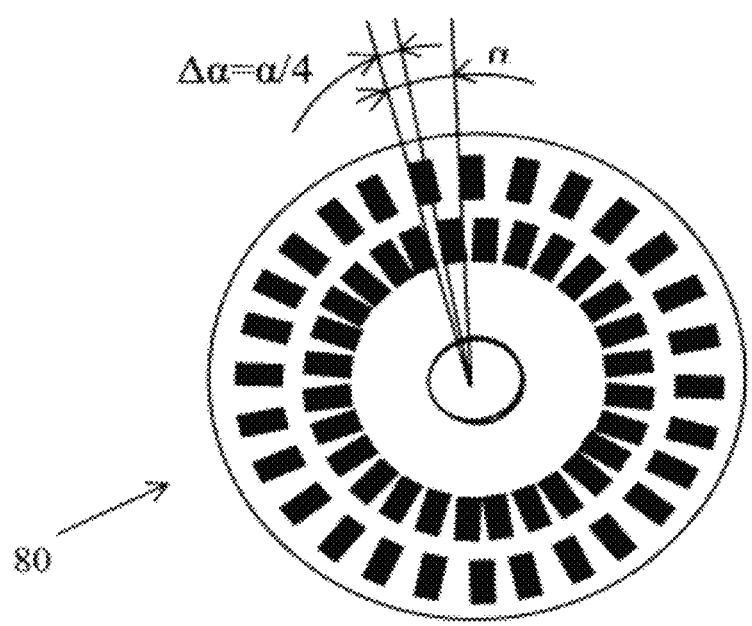

As for known encoders, various patterns may be designed so as to provide a phase difference between the two electrical signals, whereby information about the direction of rotation is provided. Examples of such patterns are shown in FIG. 7 and FIG. 8. In these figures, black areas represent segments of the annular pattern with a first optical property (for example opaque) while white areas represent segments with a second optical property (for example transparent). As explained before, these different optical properties may be implemented in various ways, using different geometric shapes, coating or any other technique that changes transparency or the direction of light ray refraction. In FIG. 7, a pattern with a pair of concentric annular sections is shown, where the concentric annular sections are 'in phase', i.e. the black segments of both patterns are disposed at the same angular position. In FIG. 8, a pattern with a pair of concentric annular sections is shown, where the concentric annular sections have angular positions shifted by $\delta\alpha$ equal to one fourth of the pattern angular period $\alpha$. in the optical encoder system of the invention, the two patterns that are 'in phase' of FIG. 7 may be applied to the annular transit surfaces of the two light guides, while the pattern with the two concentric annular sections with a one fourth period phase difference may be applied to the rotating disc. A reversed solution, where the patterns "in phase" are applied to the rotating disc and the patterns with the phase difference of one fourth of the angular period are applied to the annular transit surfaces of the two light guides may also be implemented in the optical encoder system. In both cases the two electric signals received as a result of operating the inventive method will present a one fourth period phase difference (in quadrature).

It will be understood by those versed in the art that the phase difference between the concentric patterns of the light guides and the concentric patterns on the rotating disc may be of any value, so as to result in any phase difference between the two electrical signals, and the signal processing means can be programmed to perform the position calculation according to the known phase difference.

It must be further understood that the patterns may be implemented such that the optical properties vary in a continuous manner as a function of the angular position on the annular surface of the pattern. For example, the annular surface may have a periodic sinusoidal transparency over the circumference, or the surface height of the annular surface in the shaft direction may be a sinusoidal function, etc.

Figure 9:
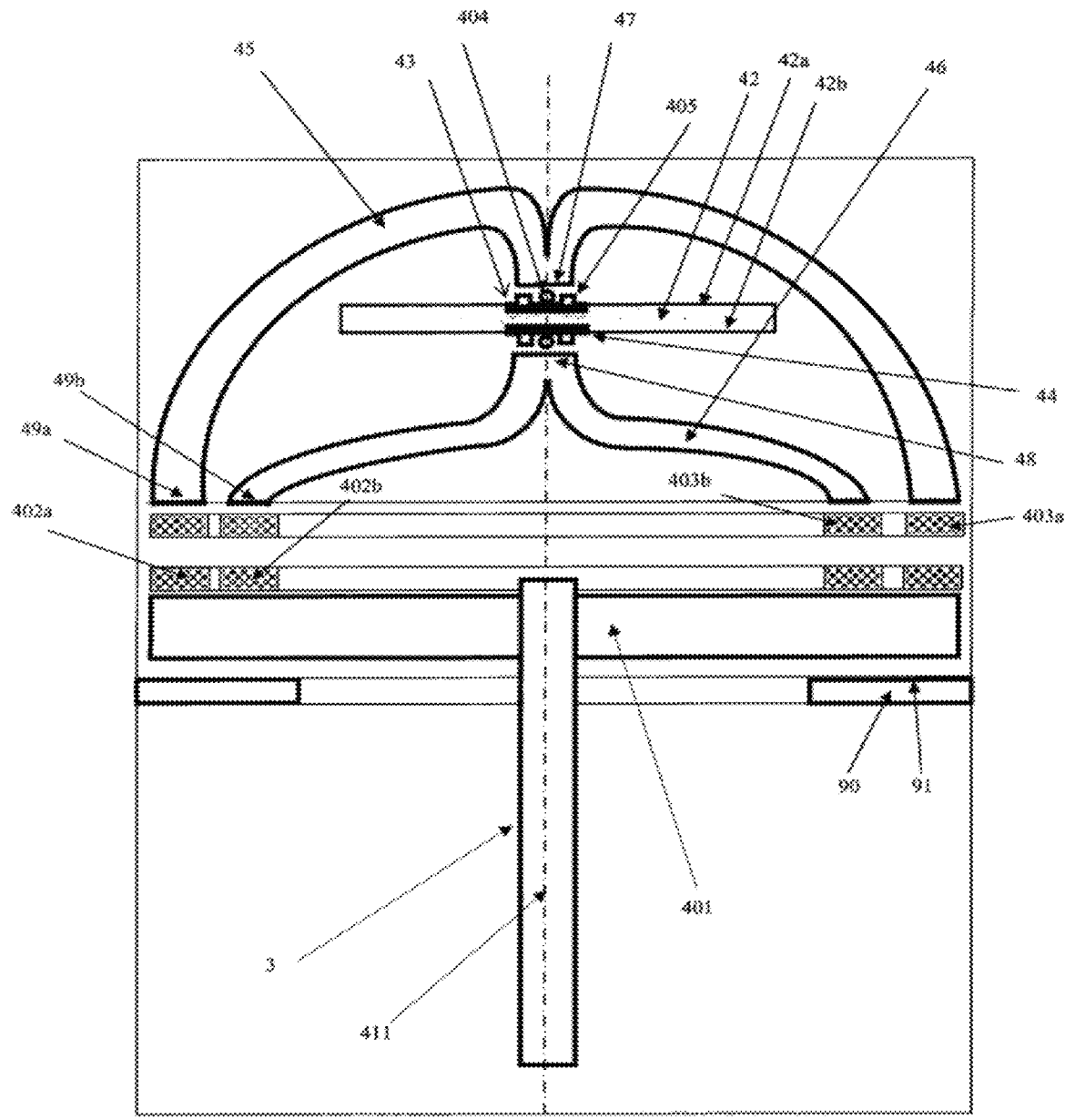
FIG. 9 is an embodiment where the rotating disc is made of transparent material, and a static reflective surface replaces the reflective surface of the rotating disc

Referring to FIG. 9, an embodiment of the encoder is shown were the reflective surface (90) as well as the stationary patterns (403a, 403b) and the rotary patterns (402a; 402b) are implemented on components (96 and 98) that are disposed separately of the light guides and rotating disc. The embodiment of FIG. 9 differs from the embodiment of FIG. 4 in that the rotating device 401 is made of transparent material and a separate static device (90) with a reflective surface 91 is provided. It will be understood that in this embodiment the light exiting through the annular transit surfaces (49a; 49b) is propagated towards the reflective surface 91 through the stationary pattern (403a; 403b), the rotary pattern (402a; 402b) and the transparent device 401 that may be a transparent optical disc. It will be further understood that the light reflected by the reflective surface 91 is again propagated through the rotary pattern (402a; 402b) and the stationary pattern (403a; 403b) such that it interacts twice with the said rotary and stationary patterns and the amount of light returning to the optical guides (45, 46) is a function of the relative angular position of the said stationary pattern and the said rotary pattern. It will be understood that a further embodiment of the inventive system may be made wherein the rotating device (402) is located below the transparent rotating device 401.

Figure 10:
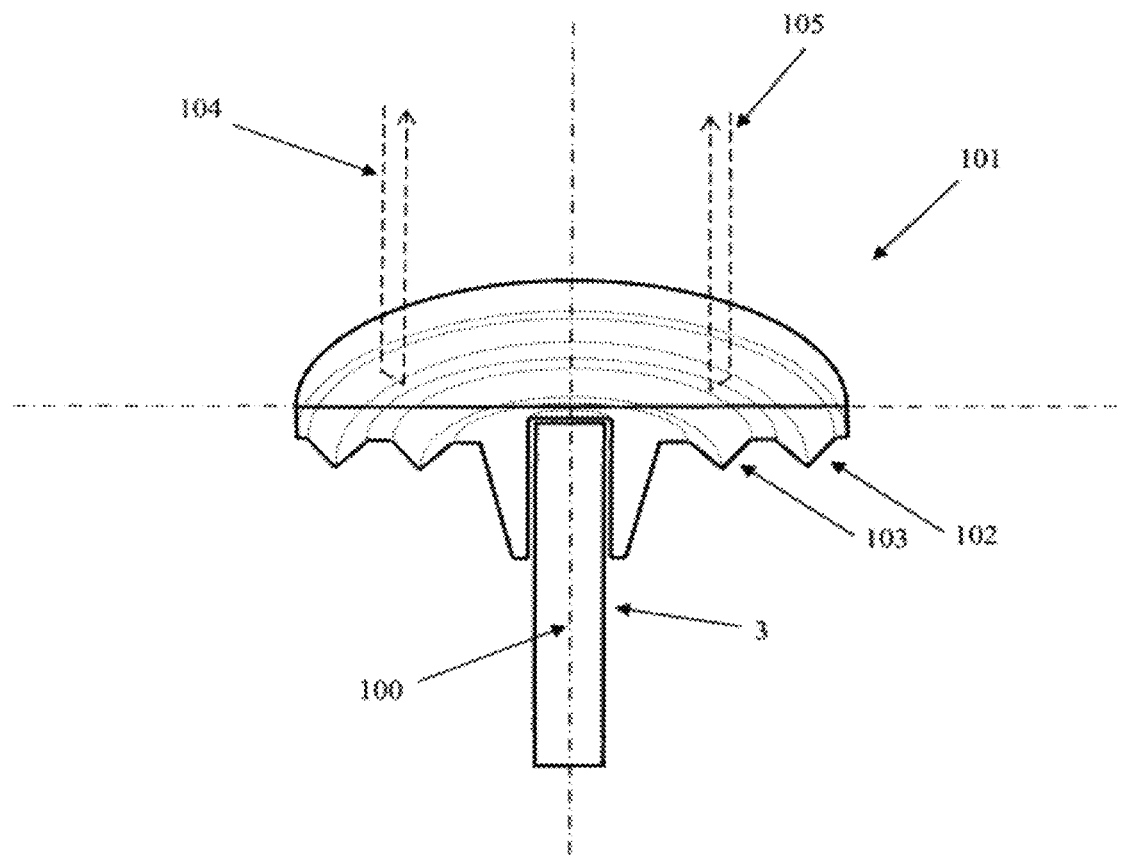
FIG. 10 shows a cross section of an embodiment of a rotating disc with retro-reflective V shaped protuberances.

FIG. 10 shows an embodiment of a rotating disc (101) fixed on a rotating shaft 3 and having as center of radial symmetry the rotation axis 100 of the rotating disc 3, wherein the reflective surfaces of the rotating disc are implemented in the form of two annular V shaped protuberances (102,103) on the lower side of the rotating disc, both surfaces of the V shaped protuberances having a 45 degrees angle with the shaft axis. The rotating disc is made of transparent material having a refraction index chosen such that the light rays (104, 105) exiting from the upper and lower light guides are reflected twice by the inclined surfaces of the V shaped protuberance, whereby the light rays (104, 105) are returned in the direction of the light guide from which they were emitted. The V shaped protuberances are disposed beneath the annular exit surface of a pair of overlying light guides (not shown), such that the reflected rays (104, 105) reenter the light guides through the said annular exit surfaces. On the upper surface of the optical disc (101) an optical pattern may be provided, or as shown in the embodiment of FIG. 9, an optical pattern may be provided on a separate component attached to the rotating disc.

It will be understood that the embodiment of an optical disc with a V shaped retro-reflector is advantageous, since it does not require additional treatment of the rotating disc, thus lowering production costs.

In accordance with yet another embodiment of the optical disc, a pattern may also be provided by dividing the V-shape retro-reflector in sectors with alternating V and flat shape.

In the inventive optical encoder assembly one of the factors that affect precision of measurement is the amount of light returned to the sensor from the optical patterns. In order to minimize dispersion and maximize the amount of light reaching the sensors mounted on the optical areas, various light focusing means were designed for guiding the returning light rays toward the light sensors, as shown in FIGS. 11, 12 and 13.

Figure 11:
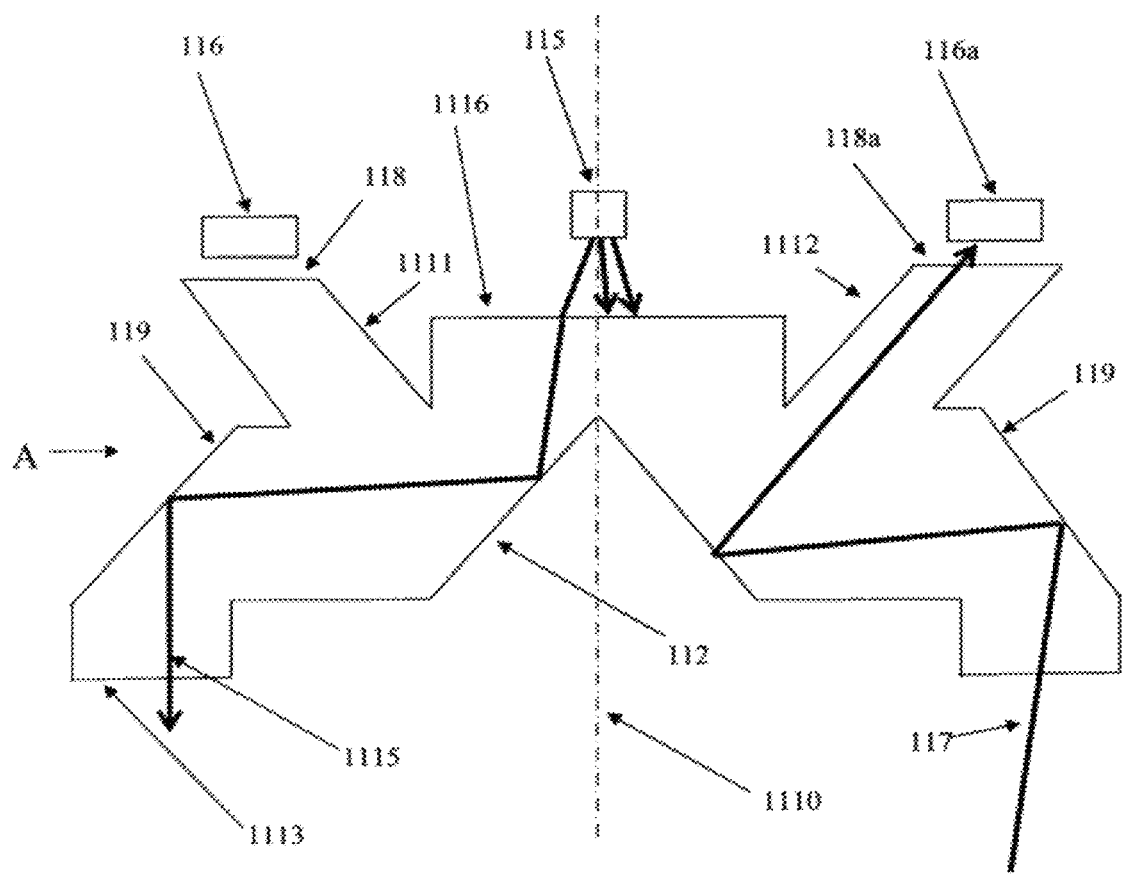
FIG. 11 is a cross section of an embodiment of a lower light guide.

Referring to FIG. 11, a cross section of an embodiment for a lower light guide A is shown. The light guide A has a radial symmetry around the axis (1110), except for two protuberances (1111, 1112) that guide light rays to light sensors (116, 116a). The light source (115) emits light rays (such as light ray 1115) that enter the light guide through its entrance surface (1116); a conical light focusing means (112) radially reflects the light rays in a direction perpendicular to the axis of symmetry 1110 wherein the reflection occurs due to the law of total reflection and the refraction index of the transparent material of the light guide A. The rays (1115) are reflected again by a second conical surface (119) in a direction approximately parallel to the axis of symmetry, and exit the light guide at the annular exit surface (1113). Light rays like 117 that are reflected back from a rotating disc (not shown) enter the light guide A at the above mentioned annular exit surface (1113) and are reflected by the conical surfaces (119) and (112) successively to be propagated in the direction of the light sensors 116, 116*a* through exit surfaces 118, 118*a* respectively. It will be understood that unless the dispersion of light, all light rays would return following the path of the emitted light and none of the rays would reach the light sensors. However, dispersion occurs, and a fraction of the returned light rays are reflected toward the light sensors by the conical surfaces (112) and (119).

Figure 12:
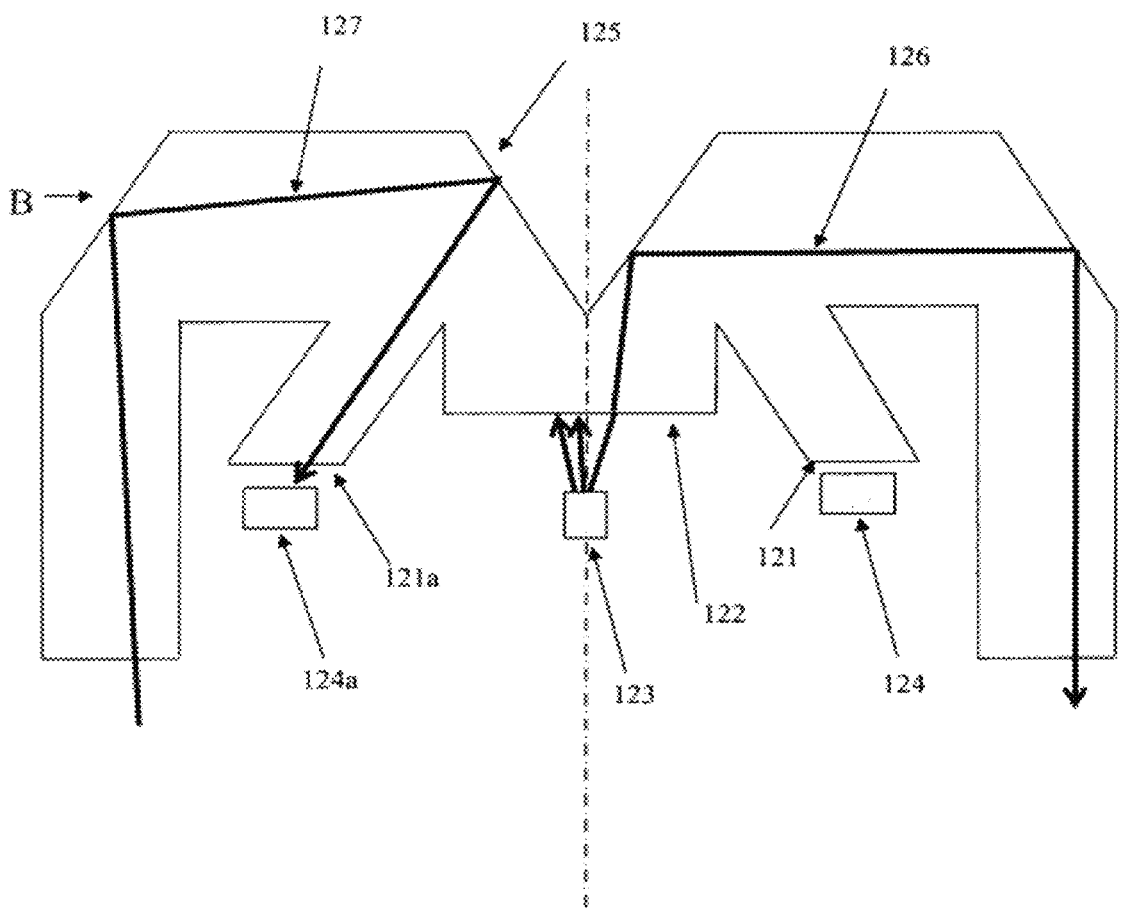
FIG. 12 is a cross section of an embodiment of an upper light guide.
Figure 13:
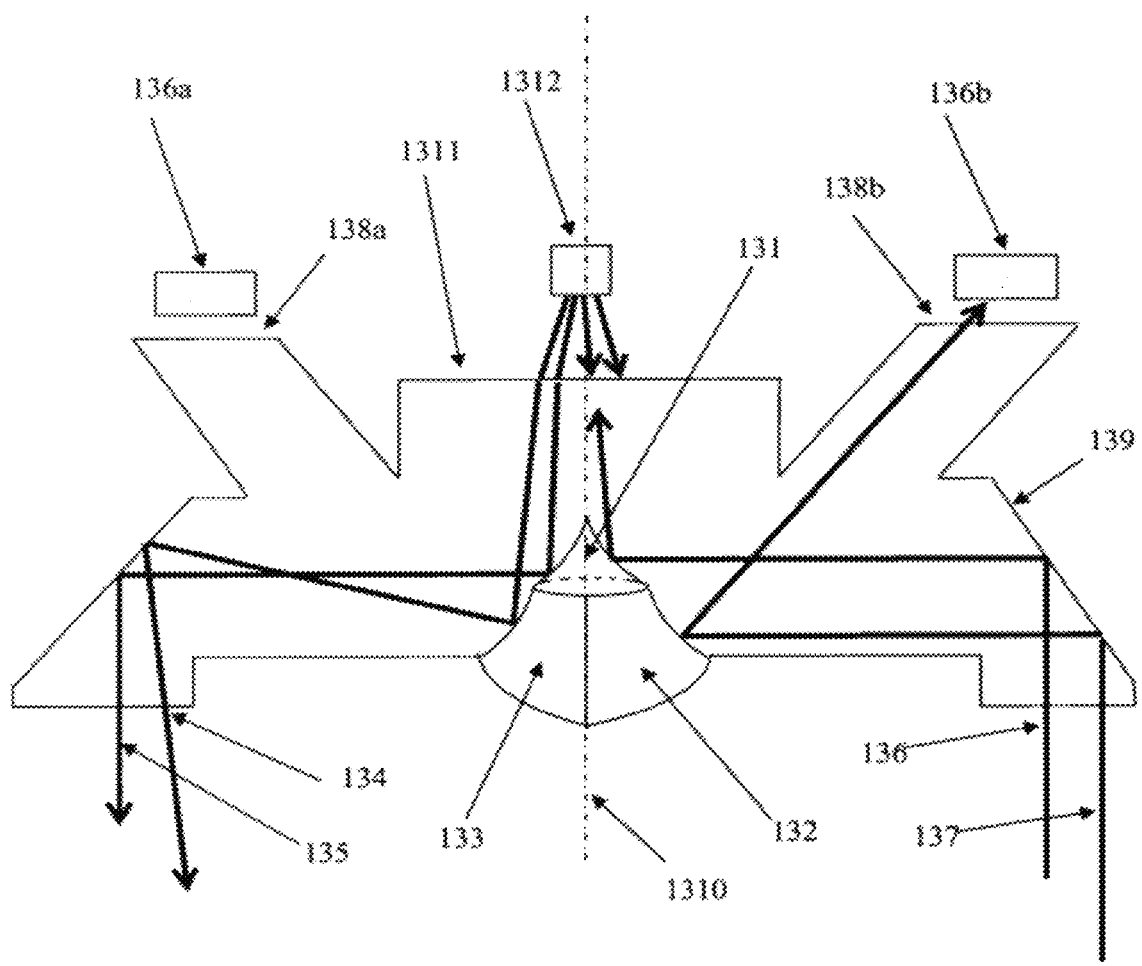
FIG. 13 is an example of a focusing means with a reflective surface split into three areas.

Referring to FIG. 12, a similar embodiment is shown for an upper light guide B, having an entrance surface (112) facing down.

In the embodiments of FIGS. 11 and 12, it is necessary to provide a relatively large number of sensors around the light source in order to obtain a symmetric contribution of all sections of the patterns. Further, if the dispersion of the light source is small, the amount of light reaching the sensors is small, resulting in a relatively low signal to noise ratio.

An improvement to the embodiments of FIGS. 11 and 12 is shown in FIG. 13. In this embodiment, two light sensors are used with each light guide. The conical light focusing means (102) of FIG. 10 is here replaced by a light focusing means with a reflective surface that is divided in three surface areas (131, 132, 133), each area being designed so as to focus the light from and to one device, light source (1312) or light sensor (136*a*; 136*b*). Surface area (131) radially reflects light rays emitted from the light source means (1312) all around the said surface area (131) and in a direction that is perpendicular to symmetry axis (1310), as shown for ray 135. The surface area (135) can be designed in accordance with known optical principles so as to minimize dispersion. Thus for example the surface area (135) cross section may have a parabolic shape. Other rays emitted from the light source means (1312) reach the surface areas (132) and (133) and are reflected with a relatively large dispersion, these rays having a high probability of being lost, i.e. of not being returned to any of the sensors . The rays (like 137 and 138) that are returned to the light guide through the annular transit surface after interaction with the static and stationary patterns (not shown), reach one of the three areas (131, 132, 133). The returned rays that reach the upper surface area (131) are reflected back to the light source, and thus are lost, as shown for ray 136. The returned rays (like 137) that reach surface areas (132) or (133) will be reflected toward the light sensor means (136*a*; 136*b*). This partition of the reflective surface of the light focusing means into multiple surface sections (121, 122, 123) allows a more precise design, whereby the amount of light returning to light sensors can be calculated and maximized, thus providing a much bigger intensity of electric signals of the light sensor, whereby the signal to noise ratio is improved. The design of the reflective surface can be made to minimize dispersion, whereby sensitivity of the encoder to precision and quality of the reflecting surfaces of the inventive optical encoder system is reduced.

It is another advantage of the embodiment of FIG. 13, increasing the precision of the inventive optical encoder system, that surface areas (132) and (133) can be designed to have a mathematically calculated shape that reflects a maximum amount of rays returned toward the light sensors and as a result, the amount of rays reflected to the sensors is almost the same for all sections of the patterned annular surface.

While particular embodiments of the present invention have been shown and described, it will be obvious to those skilled in the art that changes and modifications may be made without departing from this invention in its broader aspects and, therefore, the appended claims are to encompass within their scope all such changes and modifications as fall within the true spirit and scope of the invention.

The invention claimed is:

1. An optical encoder system for measuring the rotary angle of a shaft rotatable about a rotary axis, comprising:
    first and second pattern arrays operatively associated with said shaft to rotate therewith about said rotary axis; said first and second pattern arrays being concentric to each other and to said rotary axis of the shaft; each of said pattern arrays including alternating segments of different optical properties;
    first and second light guides fixed with respect to said shaft concentric to each other and to said rotary axis of the shaft on one side of said first and second pattern arrays; each of said light guides being of bell-shape, having a small diameter end serving as a light entry surface and a light exit surface for its respective light guide, and a large diameter end having transit surfaces aligned with one of said pattern arrays;
    light emitters for transmitting light into said small diameter ends of said light guides;
    and light sensors for sensing light exiting from said small diameter ends of said light guides;
    characterized in that said light emitters and light sensors are carried by an electronic board interposed between said small diameter ends of the first and second light guides, with one face of the electronic board carrying a light emitter and a light sensor for said first light guide, and the opposite face of the electronic board carrying a light emitter and a light sensor for said second light guide.

2. The system according to claim 1, wherein said light emitter on each face of the electronic board is concentric with said rotary axis of the shaft, and said light sensor on each face of the electronic board is eccentric with respect to said rotary axis of the shaft.

3. The system according to claim 1, wherein:
    said first and second pattern arrays are carried on a rotary disc fixed to said shaft;
    said different optical properties of the alternating segments of each pattern array are different light-transmissive properties;
    and said system further includes a mirror located adjacent the face of the said disc opposite to that facing the large diameter ends of said light guides.

4. The system according to claim 1, wherein said transit surfaces on the large diameter ends of said first and second light guides are made of alternating segments of different light transmissive properties or of different geometrical shapes.

5. The system according to claim 1, wherein said transit surfaces at the large diameter ends of said first and second light guides are formed with spaced teeth defining surface segments extending perpendicularly to said rotary axis of the rotary shaft alternating with surface segments extending at a 45° angle to said rotary axis of the rotary shaft.

6. The system according to claim 1, wherein said first and second pattern arrays are carried on a rotary disc fixed to said shaft; said rotary disc being transparent and having first and second annular V-shaped protuberances on the face of the rotary disc opposite to that facing said transit surfaces at the large diameter end of said first and second light guides and effective to return the light transmitted thereto from said transit surfaces of the light guides back to said transit surfaces of the light guides.

7. The system according to claim 1, wherein said first and second light guides are each formed with conical surfaces effective to reflect the light received from said emitters at the small-diameter ends of said light guides, via their large-diameter ends, onto said first and second pattern arrays; and further conical surfaces effective to reflect the light received from said first and second pattern arrays, via the large-diameter ends of the light guides, onto said sensors at the small-diameter ends of said light guides.

8. The system according to claim 2, wherein said light sensors on each face of the electronic board are in the form of a circular array of sensors circumscribing its respective emitter.

9. The system according to claim 3, wherein said first and second pattern arrays of alternating segments of different light-transmissive properties are radially aligned with each other to produce output signals in phase with each other.

10. The system according to claim 3, wherein said first and second pattern arrays of alternating segments of different light-transmissive properties are radially disaligned with each other to produce output signals out of phase with each other.

11. The system according to claim 3, wherein said mirror is also fixed to said rotary shaft to rotate therewith.

12. The system according to claim 3, wherein said mirror is fixed with respect to said rotatable shaft and said rotatable disc so as not to rotate with said shaft and disc.

13. The system according to claim 3, wherein said system further comprises:
   a fixed disc fixed with respect to said first and second light guides between their respective large-diameter ends and said rotary disc;
   said fixed disc also being formed with first and second concentric arrays of alternating segments of different optical properties aligned with said first and second concentric arrays of alternating segments of different optical properties of said rotary disc.

14. The system according to claim 7, wherein said light emitters on each face of the electronic board are concentric with said rotary axis of the rotary shaft, and said light sensors on each face of the electronic board are eccentric with said rotary axis of the rotary shaft.

15. The system according to claim 7, wherein said conical surfaces of each light guide include a small-diameter conical surface at the small-diameter end of the light guide concentric with the rotary axis of the rotary shaft, and a large-diameter conical surface at the large diameter end of the light guide and concentric with the rotary axis of the rotary shaft.

* * * * *